United States Patent
Badat et al.

(10) Patent No.: US 7,649,834 B2
(45) Date of Patent: Jan. 19, 2010

(54) METHOD AND APPARATUS FOR DETERMINING NEIGHBORING ROUTING ELEMENTS AND REROUTING TRAFFIC IN A COMPUTER NETWORK

(75) Inventors: Qassim Ayub Badat, Edison, NJ (US); Adam Craig Roseman, Howell, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 579 days.

(21) Appl. No.: 10/941,140

(22) Filed: Sep. 15, 2004

(65) Prior Publication Data

US 2006/0056411 A1    Mar. 16, 2006

(51) Int. Cl.
*G01R 31/08* (2006.01)
(52) U.S. Cl. .................................... 370/216; 370/254
(58) Field of Classification Search .......... 370/216–228
See application file for complete search history.

(56) References Cited

U.S. PATENT DOCUMENTS

| | | | |
|---|---|---|---|
| 5,805,599 A | 9/1998 | Mishra et al. | |
| 5,946,324 A | 8/1999 | Mishra et al. | |
| 5,974,028 A | 10/1999 | Ramakrishnan | |
| 6,339,585 B1 * | 1/2002 | Hulyalkar et al. | 370/226 |
| 6,392,990 B1 * | 5/2002 | Tosey et al. | 370/218 |
| 6,556,541 B1 * | 4/2003 | Bare | 370/235 |
| 6,807,176 B1 * | 10/2004 | Egbert et al. | 370/392 |
| 6,985,439 B2 * | 1/2006 | Hosein | 370/230 |
| 6,999,459 B1 * | 2/2006 | Callon et al. | 370/216 |
| 7,035,239 B2 * | 4/2006 | McCann et al. | 370/335 |
| 7,043,393 B2 * | 5/2006 | Fuller et al. | 370/252 |
| 7,133,906 B2 * | 11/2006 | Price et al. | 370/241 |
| 2003/0231647 A1 * | 12/2003 | Petrovykh | 370/429 |
| 2004/0017814 A1 * | 1/2004 | Shimada | 370/395.52 |
| 2004/0170181 A1 * | 9/2004 | Bogdon et al. | 370/400 |
| 2005/0169186 A1 * | 8/2005 | Qiu et al. | 370/242 |

FOREIGN PATENT DOCUMENTS

WO    WO 01/99344 A2    12/2001

OTHER PUBLICATIONS

A. Retana, L. Nguyen, R. White, A. Zinn, D. McPherson, "RFC 3137 OSPF Stub Router Advertisement", *The Internet Society* (2001).
B. Daniel, B. Omer, R. Carmel, "OSPF Open Shortest Path First", Final Projection in "Protocols and Computer Networks", Dr. Derby Koren, Tel-Aviv University.

* cited by examiner

*Primary Examiner*—Gregory B Sefcheck
*Assistant Examiner*—Joshua Smith
(74) *Attorney, Agent, or Firm*—Hoffmann & Baron, LLP

(57) ABSTRACT

A method and apparatus for rerouting traffic in a computer network select a routing element, apply a subnet mask to an interface address of the routing element to generate subnet addresses, determine the address of neighboring elements from the subnet addresses, and obtain configuration information from the neighboring elements. Network topology is determined from the configuration information, a link in the network topology is selected, and a cost associated with the link is modified. The modified cost renders the link less desirable for routing. A method and apparatus for determining the address of neighboring routing elements in a computer network, combine a subnet mask and interface address associated in a bitwise AND operation to generate subnet addresses, disregard the highest and lowest subnet addresses and the address of the selected routing element from the subnet addresses, and identify the remaining subnet address as associated with the neighboring routing element.

20 Claims, 8 Drawing Sheets

FIG. 5

| INDEX | LOCAL ROUTER | LOCAL INTERFACE | LOCAL INT STATE | LOCAL IP ADDRESS | LOCAL OSPF COST | REMOTE ROUTER | REMOTE INTERFACE | REMOTE IP ADDRESS | REMOTE OSPF COST | NEW OSPF COST |
|---|---|---|---|---|---|---|---|---|---|---|
| | | | | | | Local Router: routerA | Retreiving OSPF Costs ..... | | | |
| n/a | routerA | none | | none | none | skipping this interface ... | | | | |
| n/a | routerA | Ethernet 0 | | a,b,c .3 | none | skipping this interface ... | | | | |
| n/a | routerA | loopback 0 | | a,b,c .1 | none | skipping this interface ... | | | | |
| 1 | routerA | pos 1/1/1 | | a,b,c .82 | 50 | routerX | POS0/0 | a,b,c .81 | 50 | 50000 |
| n/a | routerA | pos 1/2/1 | | none | 50000 | skipping this interface ... | | | | |
| n/a | routerA | pos 1/3/1 | | a,b,c .10 | none | problem connecting to "a.b.c .9",port 23: connect timed-out | | | | |
| n/a | routerA | pos 1/3/2 | | none | none | skipping this interface ... | | | | |
| n/a | routerA | pos 1/3/3 | | none | none | skipping this interface ... | | | | |
| n/a | routerA | pos 1/3/4 | | a,b,c .90 | none | problem connecting to "a.b.c .189",port 23: connect timed-out | | | | |
| 2 | routerA | pos 1/4/1 | | a,b,c .57 | 60 | routerX | POS0/0 | a,b,c .58 | 60 | 50000 |
| 3 | routerA | pos 1/5/1 | | a,b,c .10 | 50 | routerX | POS0/0 | a,b,c .9 | 50 | 50000 |
| n/a | routerA | pos 1/8/1 | | none | none | skipping this interface ... | | | | |
| n/a | routerA | pos 1/8/2 | | none | none | skipping this interface ... | | | | |
| n/a | routerA | pos 1/12/1 | | none | none | skipping this interface ... | | | | |
| 4 | routerA | pos 1/12/2 | | a,b,c .21 | 150 | routerX | POS2/0 | a,b,c .22 | 150 | 50000 |

FIG. 6

Local Router: routerA — OSPF Costs retrieved last

| INDEX | LOCAL ROUTER | LOCAL INTERFACE | LOCAL IP ADDRESS | LOCAL OSPF OLD COST | LINK TYPES | REMOTE ROUTER | REMOTE INTERFACE | REMOTE IP ADDRESS | REMOTE OSPF OLD COST | NEW OSPF COST |
|---|---|---|---|---|---|---|---|---|---|---|
| 34 | routerA | composite-link CL8 | a,b,c .17 | 250 | BR | routerX | composite-link CL8 | a,b,c .18 | 250 | 50000 |
| 35 | routerA | composite-link CL14 | a,b,c .1 | 1000 | BR | routerX | composite-link CL14 | a,b,c .2 | 1000 | 50000 |
| 24 | routerA | pos 1/24/1 | a,b,c .13 | 50 | Hub | routerX | POS3/0 | a,b,c .14 | 50 | 50000 |
| 27 | routerA | pos 1/32/1 | a,b,c .9 | 50 | Hub | routerX | POS3/0 | a,b,c .10 | 50 | 50000 |
| 28 | routerA | pos 1/32/2 | a,b,c .1 | 50 | Hub | routerX | POS1/0 | a,b,c .2 | 50 | 50000 |
| 29 | routerA | pos 1/33/1 | a,b,c .5 | 50 | Hub | routerX | POS1/0 | a,b,c .6 | 50 | 50000 |
| 1 | routerA | pos 1/1/1 | a,b,c .82 | 50 | Edge | routerX | POS0/0 | a,b,c .81 | 50 | 50000 |
| 2 | routerA | pos 1/4/1 | a,b,c .57 | 60 | Edge | routerX | POS0/0 | a,b,c .58 | 60 | 50000 |
| 3 | routerA | pos 1/5/1 | a,b,c .10 | 50 | Edge | routerX | POS0/0 | a,b,c .9 | 50 | 50000 |
| 4 | routerA | pos 1/12/2 | a,b,c .21 | 150 | Edge | routerX | POS2/0 | a,b,c .22 | 150 | 50000 |
| 5 | routerA | pos 1/14/1 | a,b,c .65 | 50 | Edge | routerX | POS0/0 | a,b,c .66 | 50 | 50000 |
| 6 | routerA | pos 1/14/2 | a,b,c .98 | 100 | Edge | routerX | POS0/0 | a,b,c .97 | 100 | 50000 |
| 7 | routerA | pos 1/15/2 | a,b,c .97 | 100 | Edge | routerX | POS6/0 | a,b,c .198 | 100 | 50000 |
| 8 | routerA | pos 1/15/3 | a,b,c .182 | 100 | Edge | routerX | POS10/0 | a,b,c .181 | 100 | 50000 |
| 9 | routerA | pos 1/15/4 | a,b,c .13 | 150 | Edge | routerX | POS2/0 | a,b,c .14 | 150 | 50000 |
| 10 | routerA | pos 1/16/1 | a,b,c .22 | 60 | Edge | routerX | POS6/0 | a,b,c .121 | 60 | 50000 |
| 11 | routerA | pos 1/17/2 | a,b,c .42 | 50 | Edge | routerX | POS0/0 | a,b,c .41 | 50 | 50000 |
| 12 | routerA | pos 1/18/2 | a,b,c .106 | 150 | Edge | routerX | POS0/0/0 | a,b,c .105 | 150 | 50000 |

FIG. 7

Local Router: routerA | Restoring OSPF Costs .....

| INDEX | LOCAL ROUTER | LOCAL INTERFACE | LOCAL IP ADDRESS | LOCAL OSPF OLD COST | LINK TYPE | REMOTE ROUTER | REMOTE INTERFACE | REMOTE IP ADDRESS | REMOTE OSPF OLD COST | NEW OSPF COST |
|---|---|---|---|---|---|---|---|---|---|---|
| 36 | routerA | composite-link CL29 | a,b,c .29 | 50000 | BR local | routerX | composite-link CL23 | a,b,c .130 | 50000 | 50 |
| 1 | routerA | pos 1/1/1 | a,b,c .82 | 50000 | Edge | routerX | POS0/0 | a,b,c .81 | 50000 | 50 |
| 2 | routerA | pos 1/4/1 | a,b,c .57 | 50000 | Edge | routerX | POS0/0 | a,b,c .58 | 50000 | 60 |
| 3 | routerA | pos 1/5/1 | a,b,c .10 | 50000 | Edge | routerX | POS0/0 | a,b,c .9 | 50000 | 50 |
| 4 | routerA | pos 1/12/2 | a,b,c .21 | 50000 | Edge | routerX | POS2/0 | a,b,c .22 | 50000 | 150 |
| 5 | routerA | pos 1/14/1 | a,b,c .65 | 50000 | Edge | routerX | POS0/0 | a,b,c .66 | 50000 | 50 |
| 6 | routerA | pos 1/14/2 | a,b,c .98 | 50000 | Edge | routerX | POS6/0 | a,b,c .97 | 50000 | 100 |
| 7 | routerA | pos 1/15/2 | a,b,c .97 | 50000 | Edge | routerX | POS10/0 | a,b,c .198 | 50000 | 100 |
| 8 | routerA | pos 1/15/3 | a,b,c .182 | 50000 | Edge | routerX | POS2/0 | a,b,c .181 | 50000 | 100 |
| 9 | routerA | pos 1/15/4 | a,b,c .13 | 50000 | Edge | routerX | POS6/0 | a,b,c .14 | 50000 | 150 |
| 10 | routerA | pos 1/16/1 | a,b,c .22 | 50000 | Edge | routerX | POS0/0 | a,b,c .121 | 50000 | 60 |
| 11 | routerA | pos 1/17/2 | a,b,c .42 | 50000 | Edge | routerX | POS0/0/0 | a,b,c .41 | 50000 | 50 |
| 12 | routerA | pos 1/18/2 | a,b,c .106 | 50000 | Edge | routerX | POS0/0/0 | a,b,c .105 | 50000 | 150 |
| 13 | routerA | pos 1/18/3 | a,b,c .122 | 50000 | Edge | routerX | POS1/0/0 | a,b,c .121 | 50000 | 150 |
| 14 | routerA | pos 1/18/4 | a,b,c .138 | 50000 | Edge | routerX | POS1/0/0 | a,b,c .137 | 50000 | 150 |

METHOD AND APPARATUS FOR DETERMINING NEIGHBORING ROUTING ELEMENTS AND REROUTING TRAFFIC IN A COMPUTER NETWORK

TECHNICAL FIELD

The present invention relates generally to network communication system maintenance, and more particularly to an automated method of rerouting network traffic away from a particular routing element undergoing maintenance.

BACKGROUND OF THE INVENTION

Rerouting is important where a particular network router is in need of routine or immediate maintenance. Such maintenance may be implemented by a network system administrator, but it tedious and prone to errors in the rerouting procedure. Dynamic routing in an Internet Protocol (IP)-based communication network is typically accomplished by employing an Interior Gateway Protocol (IGP), such as an Open Shortest Path First (OSPF) routing protocol. The OSPF protocol is essentially an internetworking or gateway protocol that facilitates communications with external networks.

Routing is accomplished in the OSPF protocol by each network node having a routing database containing information related to network topology (e.g., links between network nodes). The routing database is utilized by each node to determine a path for transmitting a message to a destination site. The routing or path information is typically stored in a routing table. The routing databases are updated by exchanging link-state advertisement (LSA) packets between neighboring nodes. These packets generally include information related to current links of network nodes and are typically transferred periodically and/or in the event of a modification to the network topology. The OSPF protocol designates a particular router to flood LSA packets to neighbors in broadcast-type networks, while LSA packets are transmitted via point-to-point and/or broadcast packets within non-broadcast-type networks. Thus, the OSPF protocol is capable of ascertaining the topology of an IP communication network and determining routes to be used.

The OSPF protocol may further detect disabled communication links via periodic transmission and reception of neighbor discovery and maintenance or so-called "Hello" type packets between network nodes. These packets are periodically transmitted by each node to discover neighboring nodes and to ensure communication between that node and the neighboring nodes. In addition, the OSPF protocol may determine alternative routes for current routes that utilize disabled links and are no longer viable when a particular network node is removed from active service due to periodic or non-routine maintenance. However, the OSPF routing protocol suffers from several disadvantages.

In particular, this protocol takes a finite time interval to detect and repair a broken or disabled route. Although this is unavoidable in cases where the route becomes disabled due to an unforeseen event, protocol efficiency is less than optimal when a priori knowledge is available concerning network topology changes that affect viability of routes, for example, when a network node is scheduled for maintenance or upgrading. In this case, protocol efficiency may be enhanced by determining alternative routes prior to a network topology change.

OSPF is a widely used intra-domain routing protocol. It is also a link-state routing protocol, meaning that each router within the Autonomous System (AS) discovers and builds an entire view of the network topology. This topology view is conceptually a directed graph, in which each router represents a vertex in the topology graph, and each link between neighboring routers represents a unidirectional edge. Each link also has an associated weight that is administratively assigned in the configuration file of the router. Using the weighted topology graph, each router computes a shortest path tree with itself as the root, and applies the results to build its forwarding table. This assures that packets are forwarded along the shortest paths in terms of link weights to their destinations.

The computation of the shortest path tree is referred to herein as an SPF (Shortest Path First) computation, and the resultant tree is referred to as a Shortest-Path Tree (SPT). The OSPF topology can be divided into areas defining a two level hierarchy. Area 0, known as the backbone area, resides at the top level of the hierarchy and provides connectivity to the non-backbone areas (numbered 1, 2, . . . ). The OSPF protocol assigns each link to exactly one area.

Routers that have links to multiple areas are called border routers. A router maintains the complete topology graph of each area in which it has links. A router does not possess the entire topology of remote areas, but rather only has access to information regarding the total weight of paths from one or more border routers of its areas to each node in a remote area. OSPF allows routing information to be imported from other routing protocols like Border Gateway Protocol (BGP). The router that imports routing information from other protocols into OSPF is called an Autonomous System Border Router (ASBR).

OSPF performs SPF calculation in three stages. In the first stage, it calculates routes to intra-area destinations by computing SPTs for the topology graph of each area. This stage is referred to as the intra-area stage. In the second stage, it calculates routes to each remote node by selecting an appropriate border router as an intermediate node based on the path weight information. This stage is defined as the inter-area stage.

In the final stage, it calculates routes to each external node by selecting an appropriate ASBR as an intermediate node. This stage is referred to as the external stage. Routers running OSPF are responsible for describing local connectivity in a Link-State Advertisement (LSA). These LSAs are flooded reliably to all other routers in the network, which allows the remaining routers to build node-specific views of the topology. The set of LSAs in router memory is called a link-state database and conceptually forms the topology graph for the router.

The following discussion is proved as an overview of Internet Protocol (IP) addressing concepts. An IP address is a unique identifier for a node or host connection on an IP network. The IP address is a 32-bit binary number usually represented as four (4) decimal numbers, each decimal number representing eight (8) bits in the range of 0 to 255 (known as octets), which are separated by decimal points. This is known as "dotted decimal" notation. For example, 140.179.220.200 is an IP address, the binary form of which is as follows:

10001100.10110011.1101110.11001000.

Typical values for default subnet masks are as follows:

Class A—255.0.0.0—11111111.00000000.00000000.00000000

Class B—255.255.0.0—11111111.11111111.00000000.00000000

Class C—255.255.255.0—11111111.1111111.111111.00000000

IP addresses include two parts. One part identifies the network, and one part identifies the node. The Class of the address and the subnet mask determine which portion of the IP address belongs to the network address and which portion belongs to the node address.

Applying a subnet mask to an IP address enables the network and node portions of the address to be identified. The network bits are represented by 1's in the mask, and the node bits are represented by 0's. Performing a bitwise logical AND operation between the IP address and its subnet mask results in the Network Address or Number. For example, a bitwise logical AND operation performed between the binary form of the Class B IP address 140.179.240.200 and the binary form of the Default Class B subnet mask 255.255.0.0 results in a Network Address of 140.179.0.0, as follows:

10001100.10110011.11110000.11001000
(140.179.240.200)
11111111.11111111.00000000.00000000
(255.255.000.000)
10001100.10110011.00000000.00000000
(140.179.000.000)

In accordance with Classless InterDomain Routing (CIDR), the subnet mask notation may be reduced to simplified shorthand. Specifically, rather than explicitly providing the bits of the subnet mask, the subnet mask is simply referred to by the number of 1's that start the mask. For example, rather than writing the address and subnet mask as "192.60.128.0, Subnet Mask 255.255.252.0", the network address is simply represented by "192.60.128.0/22", which indicates the starting address of the network, and the number of 1's, namely twenty-two (22), in the network portion of the address. A /22 subnet mask would be represented in binary form as follows:

11111111.11111111.11111100.00000000.

The use of CIDR notation may also be used to represent a Classful address. For example the Class A subnet mask (255.0.0.0) may be referred to as a /8 subnet mask; the Class B subnet mask (255.255.0.0) may be referred to as a /16 subnet mask; and the Class C subnet mask (255.255.255.0) may be referred to as a /24 subnet mask.

OSPF and static routes support Variable-Length Subnet Masks (VLSMs). With VLSMs, different masks may be used for the same network number on different interfaces. For example, assuming a 30-bit subnet mask is used, two bits of address space are reserved for interface host addresses. This provides a sufficient host address space for two host endpoints on a point-to-point link.

Data networks, such as those maintained by communication service providers that perform any type of regular maintenance or upgrades on routable networks experience loss and delay of data packets due to routing re-convergence during maintenance. In addition, complex non-automated configuration changes are prone to human error. For instance, during manual cost changes, the time required for a typical router having about thirty-three (33) neighbors (New York backbone router) would take about one to two hours. Most of this time would be spent discovering the neighbors by relying on network maps, guesswork using local link IP addresses, and the like. Once the maintenance activity has been completed, the operator must manually note the current configured costs and restore them, in this instance, one by one, on thirty-three (33) neighbors (routers). In many instances, this manual procedure leads to incorrect or missed link cost configurations, and asymmetric cost restorations, which result in Plant Operator Error (POE) and an increase in Defects per Million (DPM).

SUMMARY OF THE INVENTION

Accordingly, it is an object of the present invention to provide a operator definable interface, which facilitates the tasks required to gracefully cost out a routing element in a computer network before conducting maintenance on that routing element and reverse the process following maintenance, whether these tasks are performed automatically or manually, without a priori knowledge of network topology.

It is another object of the present invention to reduce or eliminate human error, such as incorrect cost changes, skipped interfaces, and asymmetric cost changes, before and after maintenance due to reconfiguration of routing elements in a computer network.

It is yet another object of the present invention to significantly decrease operator activity during the maintenance of a routing element in a computer network.

It is still another object of the present invention to provide substantial improvements in maintenance procedures and performance due to a decrease in packet loss across a computer network.

It is a further object of the present invention to provide a diagnostic interface for troubleshooting interface IP address reachability from a management network to the interface IP address of a router undergoing maintenance and its neighbors.

It is still a further object of the present invention to provide a method for determining the IP addresses of neighboring routing elements, which may be automated and/or manually performed without a priori knowledge of network topology.

The aforesaid objects may be achieved individually and/or in combination, and it is not intended that the present invention be construed as requiring two or more of the objects to be combined unless expressly required by the claims attached hereto.

Embodiments of the present invention relate to a method of routing network traffic around a routing element in a computer network. The method includes the steps of selecting a routing element, applying a subnet mask to an interface address associated with the selected routing element to generate a plurality of subnet addresses, determining an address of a neighboring routing element linked to the selected routing element from the subnet addresses, and obtaining configuration information from the neighboring routing element. The method also includes determining a network topology from the configuration information, selecting one of a plurality of links in the network topology, and modifying a cost associated with the selected link. The modified cost is adapted to render the selected link less desirable for routing therethrough, thereby routing network traffic around the selected routing element.

The method may further include prompting the operator for authentication information, verifying the authentication information, and granting access in response to a successful verification. The configuration information may be stored prior to the step of modifying the cost associated with the selected link, and restored subsequent to the step of modifying the cost associated with the selected link. The step of modifying the cost associated with the selected link may also include inputting a cost to be associated with the selected link, previewing the cost, authorizing the cost, and applying the cost to the selected link in response to authorization. Maintenance may be performed on the selected routing element after modifying the cost associated with the selected link and the configuration information may be restored following maintenance.

Embodiments of the present invention also relate to an apparatus for routing network traffic around a routing element in a computer network, which includes a processing device, input device, and display. The input device and display are operatively coupled to the processing device. The computer network includes a plurality of routing elements associated therewith, and the operator selects a routing element from the input device.

The processing device applies a subnet mask to an interface address associated with the selected routing element to generate a plurality of subnet addresses, determines an address of a neighboring routing element linked to the selected routing element from the subnet addresses, and obtains configuration information associated with the neighboring routing element. The processing device determines a network topology from the configuration information, and the operator selects a link through the input device. The operator modifies a cost associated with the selected link through the input device, which is adapted to render the selected link less desirable for routing therethrough, thereby routing network traffic around the selected routing element.

The processing device may prompt the operator for authentication information and verify the authentication information. The apparatus may also include memory operatively coupled to the processing device, which stores the configuration information prior to the step of modifying the cost. The processing device preferably restores the stored configuration information from memory subsequent to the step of modifying the cost.

The processing device may include at least one of an application specific integrated circuit (ASIC), microprocessor, microcontroller, field programmable gate array (FPGA), and computer. The input device may include at least one of a keyboard, mouse, touchpad, and trackball.

Embodiments of the present invention also relate to a method of determining the address of a routing element neighboring a selected routing element in a computer network, which includes the steps of combining a subnet mask and an interface address associated with the selected routing element in a bitwise AND manner to generate a plurality of subnet addresses. The method also includes disregarding the highest and lowest subnet addresses of the plurality of subnet addresses, disregarding the address of the selected routing element from the plurality of subnet addresses, and identifying the remaining subnet address as the address of the neighboring routing element.

Embodiments of the present invention also relate to an apparatus for determining the address of a routing element neighboring a selected routing element in a computer network, which includes a processing device, an input device, and a display. The processing device combines a subnet mask and an interface address of a selected routing element in a bitwise AND manner to yield a plurality of subnet addresses. The processing device disregards the highest and lowest subnet addresses of the plurality of subnet addresses, disregards the address of the selected routing element from the plurality of subnet addresses, and identifies the remaining subnet address as the address of the neighboring routing element.

Other objects and features of the present invention will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

FIGS. 3a and 3b are flowcharts of a method of rerouting traffic around a routing element in a computer network in accordance with the present invention.

FIG. 5 is a pictorial representation of a display showing the router selected to undergo maintenance and its neighbors.

FIG. 6 is a pictorial representation of a display showing neighboring network node router classifications and the associated cost-out values.

FIG. 7 is a pictorial representation of a display showing the network node router-under-maintenance with neighboring original link costs restored.

DETAILED DESCRIPTION

Figure 1:
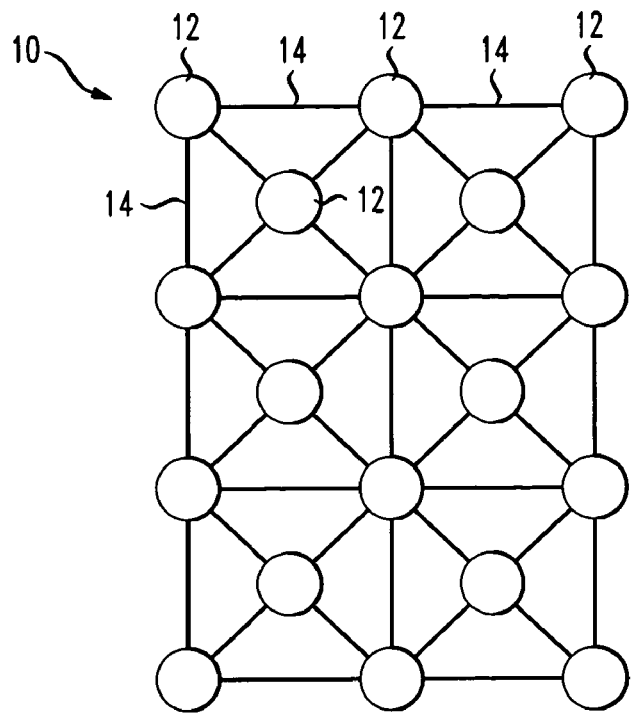
FIG. 1 is a block diagram of a computer network, which includes links and routing elements formed in accordance with the present invention.

The present invention essentially overcomes problems in the prior art by enabling operations engineers to select a routing element, automatically query the chosen element for its current Open Shortest Path First (OSPF) or other routing protocol settings, and enable one or more OSPF settings to be changed so that the selected routing element can be gracefully cost out. A cost is associated with the output side of each router interface or link. This cost is configurable by a system administrator. The lower the cost, the more likely the interface is to be used to forward data traffic. "Cost out" refers to the adjustment of the cost associated with links leading to a routing element such that these paths will gradually be circumvented by other routing elements, thereby diverting traffic away from the routing element to be "cost out". Current settings are preferably recorded for automatic restoration following the completion of maintenance.

Recent and evolving Internet Protocol (IP) applications, such as Voice-Over-IP and On-Line Gaming are increasingly susceptible to changes in the IP infrastructure due to maintenance activities. In order to mitigate customer impact, the present invention provides a novel network maintenance procedure for an IP network, which modifies OSPF costs on the links connected to the router of interest before performing maintenance on that router.

This diversion of traffic away from a router is less impacting to customers. However, this mitigation step is time-consuming and prone to human error if done manually due to the need to modify numerous link costs associated with a single router. Personnel operator error is a major source of Defects per Million (DPM) in IP backbones. In addition, difficulty with clear communication with on-site personnel can result in impact to the wrong routing element that may result in additional incidents that affect the customer.

The present invention, which may be referred to as a Routing Elements Automated Change Tool (REACT), has been designed to help smooth re-convergence and prevent human errors by automating OSPF cost configuration changes during pre- and post-maintenance activity on the routing element. This tool achieves graceful removal of the routing node from the network and reintroduction of the router back to its normal forwarding operation mode following completion of maintenance.

The REACT tool is preferably implemented in Practical Extraction and Report Language (PERL) script, which is a programming language for processing text, and gracefully costs out an IP routing element for the purpose of maintenance with the ability to derive and modify current settings from a variety of routing elements such that IP routing elements from many vendors can be accessed through a single interface.

Cost settings are preferably queried and viewed in response to a single command, and modification of routing element cost configurations preferably occurs in a controlled non-traffic impacting environment. Current costs are recorded in a unique file structure and, for a selected subset of routing elements, the tool preferably creates visual notification to on-site workforce personnel. Upon successful completion of maintenance, the tool preferably restores the initial recorded settings to automatically bring the routing element back into its routing path. The tool also preferably enables the operator to preview setting modifications prior to applying the modifications, and may restrict the scope of changes within particular guidelines.

FIG. 1 shows an example of a communication network in which the REACT module formed in accordance with the present invention may be utilized. The network 10 preferably includes a plurality of nodes 12 that facilitate communication through the network 10. The network 10 may be utilized for various applications. For example, the network nodes 12 may collect and process information for transfer to other network nodes 12 via the communication network 10. Each network node 12 preferably includes a router 16, as shown in greater detail in FIG. 2, which is interconnected with other network node routers 16 via point-to-point links 14.

The communication network 10 preferably employs a routing protocol to facilitate routing of information throughout the network 10. By way of example only, the network utilizes an Open Shortest Path First (OSPF) Internet Protocol (IP) to dynamically discover routes. However, the network may employ any routing protocol known in the art. According to the OSPF protocol, each network node 12 within the network 10 maintains a routing database (not shown) including information enabling the network node 12 to determine an appropriate path for routing a packet.

The information contained within the network node databases typically relates to links 14 between the various network nodes 12, while routing information is typically maintained within a routing table. The OSPF protocol is a link-state type routing protocol and provides for synchronization of node databases through transmission of link-state advertisement (LSA)-type or database update packets to each network node. These packets are preferably transmitted to neighboring network nodes 12 via plural point-to-point messages, for example, messages from a source node to a specific destination network node, in response to modifications to the network facilitating changes in a node database.

When a database update packet is received, a point-to-point OSPF-type acknowledgment (ACK) packet is preferably transmitted to the source node from the destination node to indicate packet reception. The OSPF protocol may further detect disabled or cost-changed communication links via periodic transmission and reception of neighbor discovery and maintenance or "Hello"-type packets between network nodes. These packets are periodically transmitted by each node to discover neighboring nodes and to ensure communication between that node and the neighboring nodes. In addition, the OSPF protocol may determine alternative routes for current routes which utilize high-cost or disabled links that are no longer viable.

The OSPF protocol is a link-state type protocol as described above, which provides several advantages with respect to distance vector-type protocols, such as Routing Information Protocol (RIP), in which routers exchange vectors of distances of preferred paths to known destinations. For example, the OSPF protocol quickly discovers and disseminates information relating to cost-changed, disabled, or broken links throughout the network. Further, link-state protocols generally have a faster convergence time than distance vector protocols. Moreover, distance vector protocols encounter the so-called "Count-to-Infinity Problem", which causes these protocols to react slowly to links becoming disabled or cost out.

The so-called "Split Horizon" algorithm partially alleviates this problem, but provides several other disadvantages. These types of convergence problems are not encountered with link-state protocols. Since each router maintains a database of the complete network topology, information relating to a disabled or cost out link may be disseminated rapidly throughout the network. The routers recompute routing tables that reflect the updated topology database. Thus, a link-state routing protocol is better suited to topology dynamics than a distance vector protocol. Although link-state protocols usually require greater overhead, the overhead associated with the OSPF protocol is significantly less than network bandwidth, as described herein.

The present invention preferably utilizes the features of the OSPF routing protocol and a priori knowledge of network topology through, for instance, anticipated or projected maintenance needs, to enhance routing performance. Network topology enables the OSPF protocol to adjust a routing table prior to links becoming disabled. The routing table adjustment essentially prevents the Internet Protocol from routing packets to disabled links, thereby avoiding loss or delay of those packets.

Figure 2:
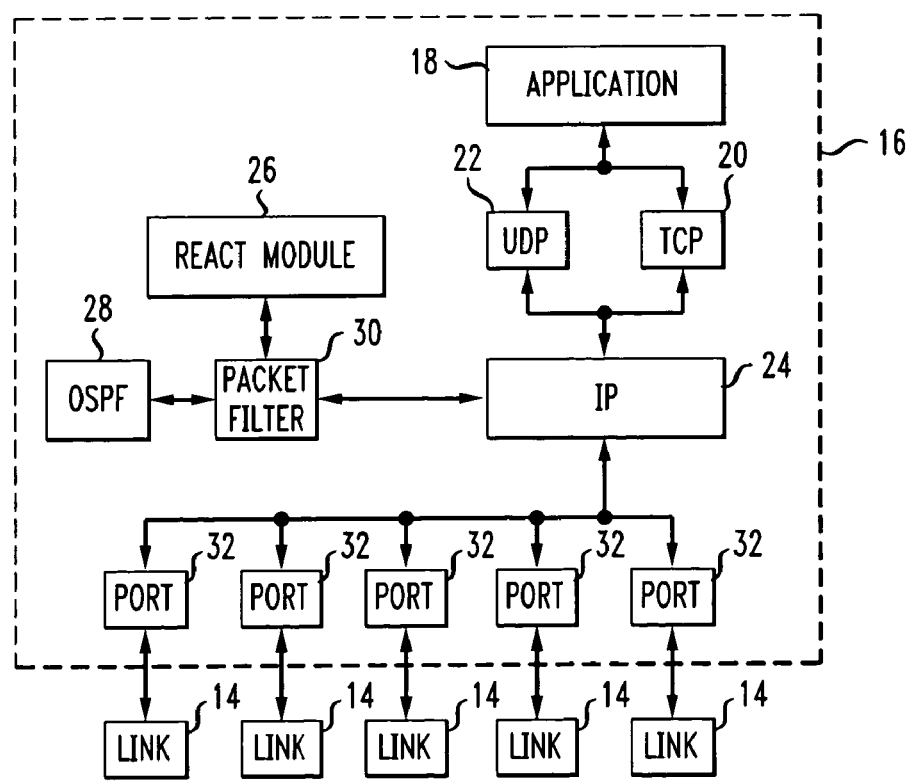
FIG. 2 is a block diagram of a routing element formed in accordance with the present invention.

A block diagram of a network router formed in accordance with the present invention is shown in FIG. 2. Each network node 12, as shown in FIG. 1, preferably includes a router 14 to route data packets throughout the network 10 and facilitate communication. Specifically, the router 14 preferably includes an application module 18, Transmission Control Protocol (TCP) module 20, Operator Datagram Protocol (UDP) module 22, Internet Protocol (IP) module 24, REACT module 26, OSPF module 28, packet filter module 30, and ports 32. These router modules are preferably implemented in software and executed by a processor (not shown) in the router. However, the modules may be implemented by software and/or hardware modules in any combination thereof.

The router ports 32 are preferably coupled to network interface cards (not shown) within the network nodes to enable communication over the links 14. The network interface cards typically encrypt, modulate, and transmit signals from a particular network node, and receive signals from other network nodes 12. Ports 32 are typically associated with corresponding links 14 coupling a particular network node to neighboring network nodes within the network topology.

The ports 32 are preferably coupled to the IP module 24. The IP module 24 implements the Internet Protocol and serves as a switch to direct outgoing data packets to the appropriate ports and to direct incoming data packets to the proper router module for further processing. IP module 24 is preferably coupled to the TCP module 20 and UDP module 22. These modules essentially enable exchange of information between network nodes or other applications on the network. Modules 20, 22 may be implemented by various transport protocols, but, by way of example only, are implemented by the Transmission Control Protocol and the Operator Datagram Protocol, respectively.

The application module 18 is preferably coupled to the transport protocol modules 20, 22 and facilitates execution of application level routines in the router 16. The packet filter module 30 is preferably coupled to the IP module 24, REACT module 26, and OSPF module 28. The OSPF module 28 preferably implements the OSPF routing protocol, while the REACT modules 26 modifies the OSPF settings to perform routing in accordance with the present invention.

Figure 3A:
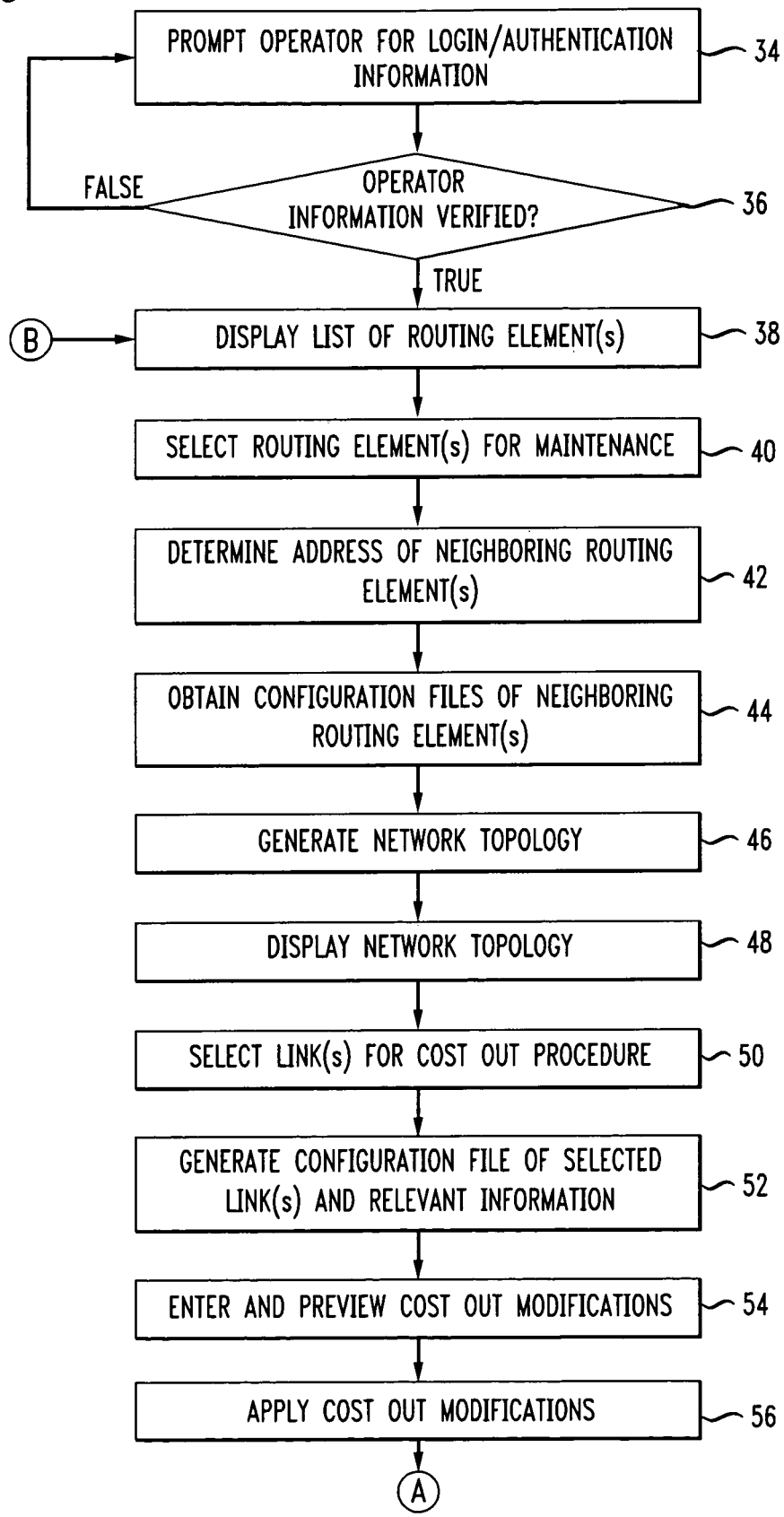
Figure 36:
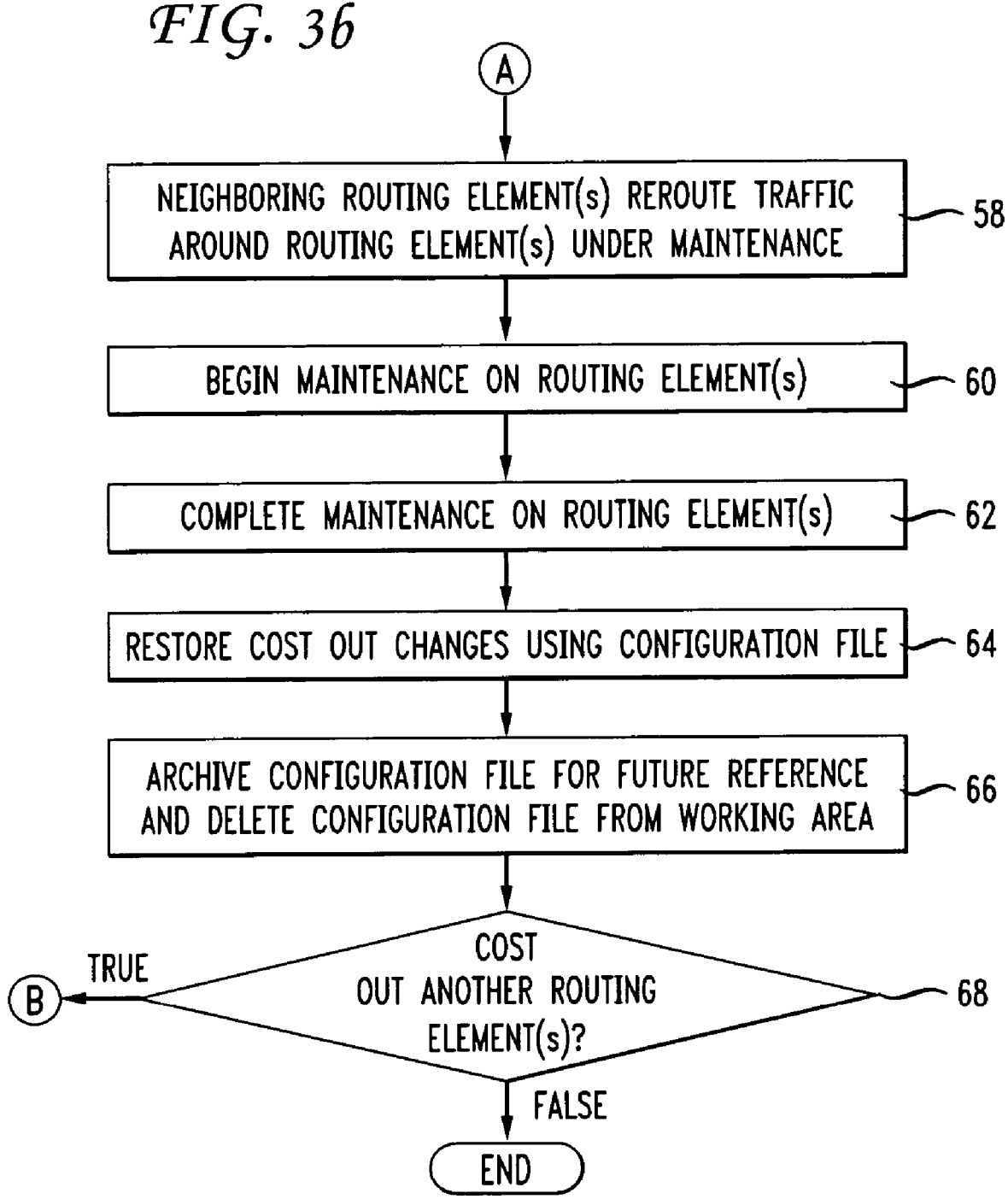
Figure 4:
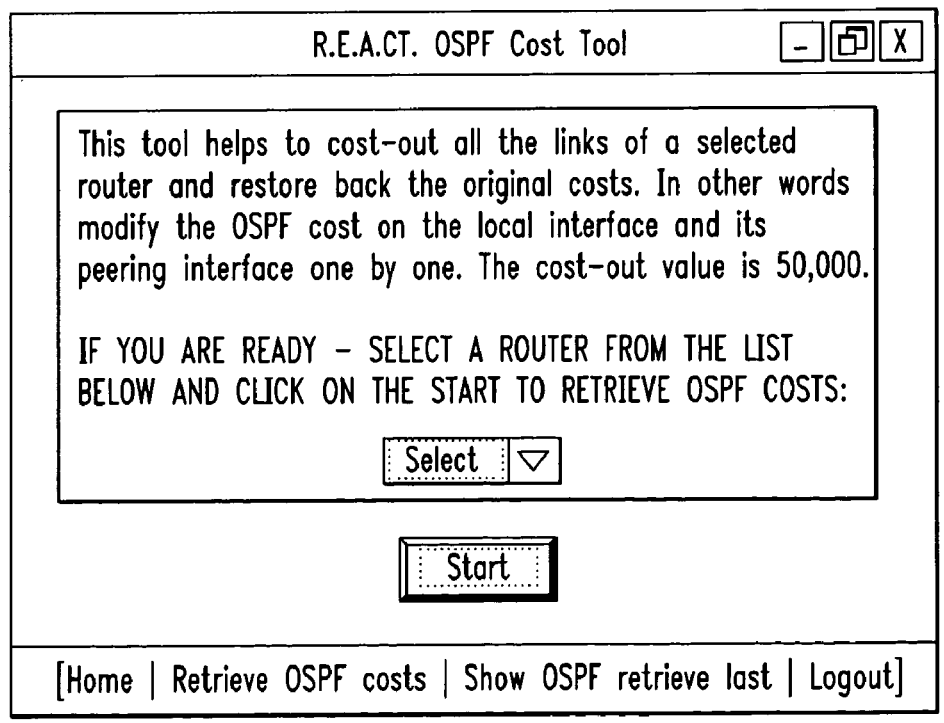
FIG. 4 is a pictorial representation of a display that enables an operator to select a router to undergo maintenance activities from a list of network node routers.

FIGS. 3a and 3b show a flow chart of a preferred method for rerouting traffic around a routing element in a computer network in accordance with the present invention. The REACT module 26 shown in FIG. 2 preferably prompts the operator for login and/or authentication information in step 34, which is verified against information stored on a remote server in step 36. A display shown in FIG. 4 is then preferably provided to the operator in step 38 so that the operator is able to select one or more routers that will undergo maintenance in step 40.

Figure 3C:
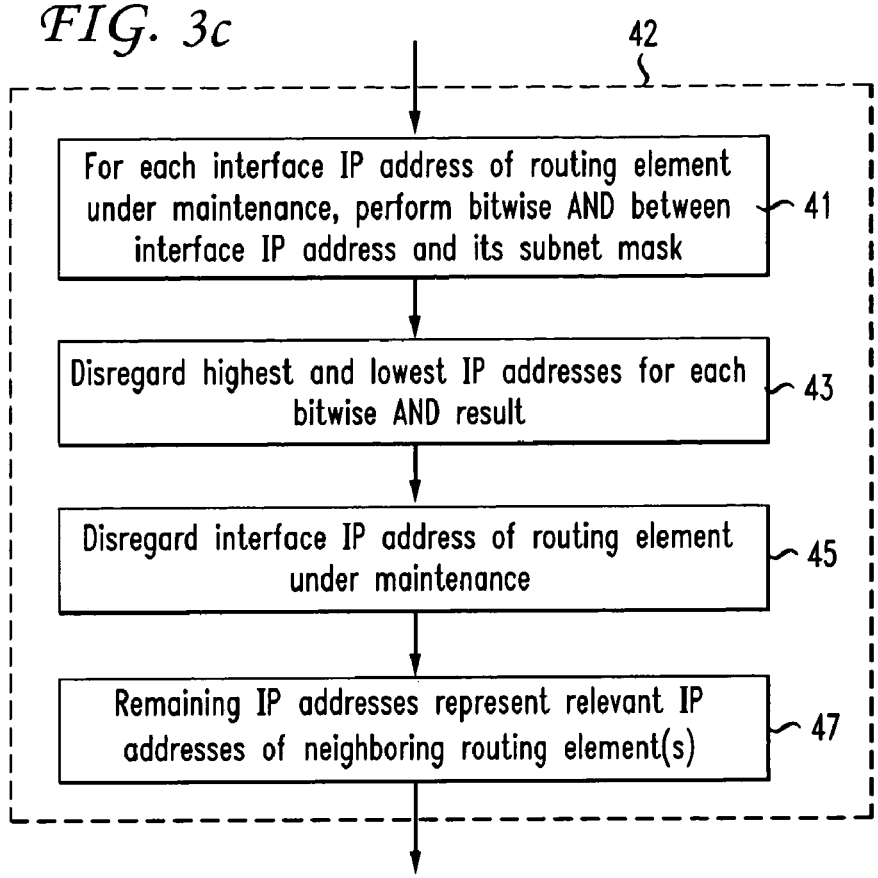
FIG. 3c is a flowchart of a method for determining the address of neighboring routing elements in accordance with the present invention.

The REACT module preferably determines the neighbors of the router selected for maintenance based on the IP address of the point-to-point links associated with the router in step 42. FIG. 3c shows that this method is achieved by bitwise ANDing a subnet-mask, such as a /30 subnet mask (255.255.255.252) with each of the interface IP addresses of the router selected for maintenance in step 41. It is to be understood that the binary digits in the result generated by the bitwise AND operation, which have been set to 0 by corresponding 0's in the subnet mask, can assume the value of 1 or 0 in generating potential addresses.

Relevant host addresses are determined after applying the subnet mask by disregarding the first or lowest IP address, which is the network IP address, and the last or highest IP address, which is the broadcast IP address in step 43. The IP interface address corresponding to the router selected for maintenance is also disregarded in step 45, which leaves only a relevant host IP address(es) in step 47. The relevant host IP address(es) is preferably used to connect to the router's neighbor(s) to obtain configuration files, which is captured in step 44 shown of FIG. 3a. The determination of neighbor addresses may be automated or performed manually while remaining within the scope of the present invention.

For example, assume that the IP address of one of the interfaces of the router-under-maintenance is configured as 1.1.1.1 following application of a /30 subnet-mask. This yields four (4) IP addresses, of which only two are relevant. They are 1.1.1.0 (the lowest IP address), which is a network IP address, 1.1.1.1 and 1.1.1.2, which are the relevant host addresses, and 1.1.1.3 (the highest IP address) which is the broadcast IP address. Hence, the REACT module 38 preferably derives only the relevant IP addresses, in this instance, the remote host being 1.1.1.2. It then uses 1.1.1.2 to connect to and discover the neighbor router and capture its configuration.

Before connecting to this derived neighboring IP address, 1.1.1.2, the tool preferably performs an exception rule set. This rule set essentially helps to avoid certain interfaces, IP addresses, and the like based on demand criteria, such as interface status (up/down), exception IP addresses (loopback0, others), and the like. If none of the exception rules applies, the tool then preferably uses 1.1.1.2 to connect to the neighboring router. Once successful, the tool preferably accesses this router and obtains its configuration information.

The process of neighbor discovery continues for all active interface IP addresses, which ultimately generates a topology showing information concerning the router-under-maintenance and all its active neighbors in step 46. The REACT module discovers point-to-point linked neighbors, and may be extended to determine multi-access links (e.g. Ethernet), hub-and-spoke configurations, sub-interface configurations, and the like while remaining within the intended scope of the present invention. However, the interface IP address should preferably be reachable from the server, on which the REACT module is running. This condition should not present a problem since the server should preferably be part of the management network that would have connectivity or reachability to all devices in the managed domain. Once the topology is generated, the results are preferably displayed in step 48 on the operator's web browser as is shown, for example, in FIG. 5.

Each row of the table in FIG. 5 provides information concerning a separate link connected to the router under maintenance (RUM). The left portion of the table provides information concerning the local side (which is directly connected to the RUM) of each of the links, and the right portion of the table provides information concerning the remote side (which is directly connected to the router on the opposite end of the link to that of the RUM) of each of the links.

An index column 80 preferably lists index numbers used to reference the corresponding links, and a local router column 82 preferably lists the identity of the router on the local side of each of the links, which is in this case the RUM (routerA). A local interface column 84 preferably lists identifiers representing the port of the RUM associated with each of the links on the local side, and a local int state column 86 lists the state of the port for each of the links. A local IP address column 88 preferably lists the IP address of the port on the RUM connected to each of the links, and a local OSPF cost column 90 lists the cost associated with the local side of each of the links. A remote router column 92 preferably lists the identity of the router connected to the remote side of each of the links, and a remote interface column 94 lists the port identifiers for each of the links on the remote side.

A remote IP address column 96 lists the IP address of the ports connected to each of the links on the remote side, and a remote OSPF cost column 98 lists the cost associated with each of the links on the remote side. A new OSPF cost column 100 lists the new costs to be substituted for the corresponding local and/or remote OSPF costs. The variable string "a.b.c" has been substituted for some of the IP addresses in the table.

The operator has the option to select all the active links or a subset of links for modification of the corresponding OSPF costs in step 50. Under normal maintenance activity during a code upgrade or hardware change, all active links are preferably selected to cost out, which may be regarded as a default. This is done in order to divert live traffic. The value of the cost used for cost out is preferably 50,000. However, this can be set to a different value depending on a calculation that determines the optimal cost value that will reroute traffic on a particular link for a particular network configuration. The OSPF cost change command used on the router is preferably the following:

Vendor A/Vendor B/Vendor C: ip ospf cost <0-50,000>, in which the cost to be assigned to a chosen link can vary from 0 to 50,000.

Until this stage, all the discovered information is preferably maintained in the server's memory. Once the selection is made, a unique file is preferably created and the cost out information is preferably stored as a data structure in step 52. This file is preferably unique to an operator and the operator's browser session. All subsequent REACT module stages preferably use this file to retrieve the cost out data. In addition, neighboring routers are preferably classified based on their network function, as shown in a link types column 102 in FIG. 6. The link types include Bride Router (BR), Hub Router (HR), and Edge Router (Edge). The new OSPF cost column 100 in FIG. 6 preferably previews the new costs to be associated with the local and/or remote ends of each of the links prior to their application during the cost out stage.

In step 54, the operator preferably enters proposed cost-out changes and is able to preview these changes before they are applied in step 56. The OSPF cost out changes are preferably performed asymmetrically. That is, the changes are preferably implemented on the routers surrounding the router-under-maintenance (the outer ring). The actual configuration changes are processed sequentially on pre-ordered listed neighbor routers. In a particular common backbone IP network, the order of cost out is preferably selected to maximize efficient traffic diversion. In its simplest form, routers with heavy traffic are diverted first and routers with lighter traffic are diverted later. During the cost restoration stage, the initial cost out order list is preferably reversed.

When the router-under-maintenance is completely cost out, and all its traffic is diverted in step 58 of FIG. 3b, maintenance activity on this router preferably can begin in step 60. The activity may include a software upgrade, a hardware change, and the like. Once maintenance is complete in step 62, the operator has the option to go to the next stage of the original cost restoration in step 64. Again, the initial cost out order list is preferably reversed during the restoration stage as the traffic begins to flow through the router that has undergone maintenance.

The REACT module preferably retrieves the cost out data from the unique file pertaining to the session. The actual cost in stage is similar to the cost out stage, except that the value of the cost/weight is reset to the original (pre-cost out) configuration. As shown in FIG. 7, the new OSPF costs are preferably previewed in the new OSPF cost column 100 prior to their application during the cost in stage. The OSPF cost in changes are also processed asymmetrically. That is, the changes are preferably implemented on the routers surrounding the router-under-maintenance (the outer ring). The actual configuration changes are implemented sequentially on pre-ordered listed neighbor routers in a reverse order. In a particular Common Backbone IP network, the order of cost in is preferably selected to maximize efficient traffic flow after a maintenance activity. In its simplest form, routers with lighter traffic are reintroduced first and routers with heavy traffic are introduced later.

Upon completion of the OSPF cost restoration, the unique file is preferably archived in a different location for future reference and deleted from the working area in step 66. The operator has the option to start maintenance activity using the REACT module on another router in step 68, for which a new session identification and a new unique file are preferably created, or end the process. This unique file and session identification enable multiple maintenance activities on multiple routers by one or more operators during one or more browser sessions. The method represented in FIGS. 3a and 3b may be automated or performed manually while remaining within the scope of the present invention.

Figure 8:
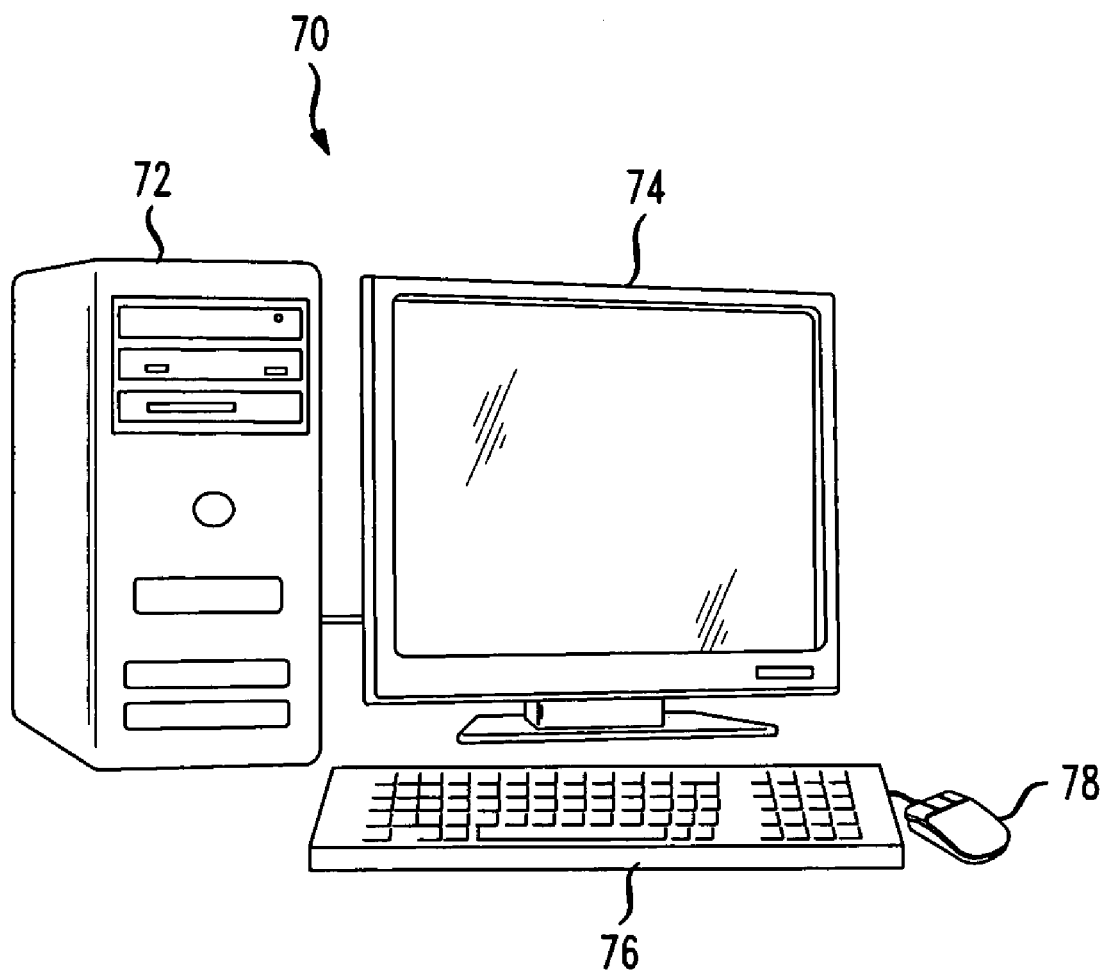
FIG. 8 is a pictorial representation of a computer system for use in rerouting traffic in a computer network in accordance with the present invention.

FIG. 8 shows a preferred embodiment of a computer system 70 for rerouting network traffic in a computer network in accordance with the present invention. The system 70 preferably includes a computer 72, display 74, keyboard 76, and mouse 78, and/or additional data entry devices, such as a trackball and touchpad. The computer 72 preferably includes an application specific integrated circuit (ASIC), microprocessor, microcontroller, and/or field programmable gate array (FPGA). The system 70 is preferably coupled with the computer network at a server or routing element undergoing maintenance and permits operator access to the REACT tool.

An OSPF Stub Advertisement feature is documented in RFC 3137, which is incorporated herein by reference, and is a useful feature for steering traffic away from a router by announcing the maximum OSPF metric (0xffff) for non-stub interfaces associated with a router under certain conditions. These conditions may include the following:
1. upon router boot-up, for a specified time period;
2. upon router boot-up, until Border Gateway Protocol (BGP) has fully converged;
3. prior to maintenance activity that may be disruptive to the router;
4. upon loss of a specified set of BGP sessions;
5. upon the number of routes in the Routing Information Base (RIB) dropping below a certain threshold; and
6. after the conditions cease to exist (or applicable timers expire), the OSPF costs revert to their configured values.

However, there are limitations when using the Stub Advertisement feature as compared with use of the REACT module in accordance with the present invention. The Stub Advertisement feature is only useful on transit routers in the network, for which there exists an alternate path via another router or routers. These transit routers include Bridge Routers (BR) or Hub Routers (HR). This feature is not useful on an edge router, such as an Access Router (AR) or Multi-Service Edge Router (MSE), or Internal Gateway Router (IGR), since these do not act as transit routers from an OSPF perspective. Therefore, the OSPF Stub Advertisement feature is specific to HRs and BRs only. However, the REACT Tool can work on any router that has neighboring interfaces reachable from the server.

Packet loss may be minimized with the OSPF Stub Advertisement feature by instantly announcing all links with maximum-metric using one OSPF router LSA. This simplifies the graceful cost out procedure, since neighboring routers need not be modified. The syntax to configure this feature under the router OSPF context is as follows:

Enable: max-metric router-lsa
Disable: no max-metric router-lsa

The REACT module may be configured to perform functions in accordance with RFC 3137 while remaining within the scope of the present invention.

Thus, automating or manually performing OSPF cost change configurations associated with routers in accordance with the present invention eliminates human errors, such as incorrect cost changes, skipped interfaces, asymmetric cost change during restorations, as well as greatly decreasing maintenance window activity. The effect of using this tool results in significant improvements in maintenance procedures and performance due to a substantial decrease in packet loss. Another benefit provided by the REACT module is that it can be used to aid in troubleshooting interface IP address reachability from the REACT server's management network to the interface IP address of the router-under-maintenance and its neighbors. The present invention also provides an improved method for determining the IP addresses of neighboring routing elements, which can be automated or performed manually.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of causing network traffic to be rerouted in a computer network comprising:
    applying a subnet mask to an interface address associated with a selected routing element in the computer network to generate a plurality of subnet addresses;
    determining an address of a neighboring routing element from the plurality of subnet addresses, the neighboring routing element being linked to the selected routing element;
    obtaining configuration information from the neighboring routing element using the address, the configuration information comprising an initial cost;
    determining a network topology from the configuration information, the network topology comprising a plurality of links;
    selecting one of the plurality of links, the initial cost associated with the selected link;
    storing the configuration information including the initial cost in a file in response to selecting one of the plurality of links, the file uniquely identifying an operator and including a unique session identification in which maintenance activity is to be performed by the operator;
    modifying the initial cost associated with the selected link with a modified cost, the modified cost being adapted to render the at least one selected link less desirable for routing therethrough, the network traffic being routed around the selected routing element in response to the modified cost, the modifying being performed by providing a preview of the effect that the modified cost will have on rerouting of the network traffic in the computer network prior to applying the modified cost, receiving authorization to associate the modified cost with the selected link, and applying the modified cost to the selected link in response to receiving the authorization;
    restoring, automatically, the computer network to its original initial state in response to completion of maintenance activities in the computer network by the operator by identifying the file corresponding to the operator and the session identification; and
    modifying the computer network with the configuration information stored therein.

2. A method of causing network traffic to be rerouted in a computer network defined by claim 1, the method further comprising the steps of:
    prompting the operator for authentication information;
    verifying the authentication information; and
    granting access to the operator in response to successfully verifying the authentication information.

3. A method of causing network traffic to be rerouted in a computer network defined by claim 1, further comprising the step of displaying the network topology.

4. A method of causing network traffic to be rerouted in a computer network defined by claim 1, further comprising the step of archiving the configuration information.

5. A method of causing network traffic to be rerouted in a computer network defined by claim 1, further comprising the step of performing maintenance on the selected routing element.

6. A method of causing network traffic to be rerouted in a computer network defined by claim 1, wherein the step of applying a subnet mask further comprises the step of combining the subnet mask and the interface address associated with the selected routing element in a bitwise AND manner to generate the plurality of subnet addresses.

7. A method of causing network traffic to be rerouted in a computer network defined by claim 6, wherein the step of determining the address of the neighboring routing element from the plurality of subnet addresses further comprises the steps of:
    disregarding the highest and lowest subnet addresses of the plurality of subnet addresses;
    disregarding the address of the selected routing element from the plurality of subnet addresses; and
    identifying the remaining subnet address as the address of the neighboring routing element.

8. A method of causing network traffic to be rerouted in a computer network defined by claim 6, wherein the method is at least one of automated and performed manually.

9. An apparatus for causing network traffic to be rerouted in a computer network, the apparatus comprising:
    a processing device;
    an input device, the input device being operatively coupled to the processing device;
    a display, the display being operatively coupled to the processing device; and
    the computer network comprises a plurality of routing elements associated therewith,
        wherein the apparatus
            receives a selection of at least one of the plurality of routing elements through the input device, and
        wherein the processing device
            applies a subnet mask to an interface address associated with the selected routing element to generate a plurality of subnet addresses,
            determines an address of a neighboring routing element linked to the selected routing element from the plurality of subnet addresses,
            obtains configuration information associated with the neighboring routing element,
            determines a network topology from the configuration information, the network topology comprising a plurality of links, one of the plurality of links being selected through the input device, the configuration information comprising an initial cost associated with the selected link,
            stores the configuration information including the initial cost in a file in response to selecting one of the plurality of links, the file uniquely identifying an operator and including a unique session identification in which maintenance activity is to be performed by the operator,
            modifies the initial cost associated with the selected link with a modified cost, the effect the modified cost will have on rerouting of the network traffic in the computer network being output on the display prior to modification,
            applies the modified cost to the selected link in response to authorization, the modified cost being adapted to render the selected link less desirable for routing therethrough, the network traffic being routed around the selected routing element in response to the modified cost, and
            restores, automatically, the computer network to its original initial state in response to completion of maintenance activities in the computer network by the operator by identifying the file corresponding to the operator and the session identification, and
            modifies the computer network with the configuration information stored therein.

10. An apparatus for causing network traffic to be rerouted in a computer network defined by claim 9, wherein the processing device prompts the operator for authentication information, the processing device verifying the authentication information, the processing device granting access to the operator in response to successfully verifying the authentication information.

11. An apparatus for causing network traffic to be rerouted in a computer network defined by claim 9, further comprising memory, the memory being operatively coupled to the processing device, the processing device storing the configuration information prior to the step of modifying the cost associated with the selected link, the processing device restoring the cost associated with the selected link to the initial cost from memory subsequent to the step of modifying the cost associated with the selected link.

12. An apparatus for causing network traffic to be rerouted in a computer network defined by claim 9, wherein the network topology is displayed on the display.

13. An apparatus for causing network traffic to be rerouted in a computer network defined by claim 9, wherein the configuration information is archived in memory.

14. An apparatus for causing network traffic to be rerouted in a computer network defined by claim 9, wherein maintenance is performed on the selected routing element.

15. An apparatus for causing network traffic to be rerouted in a computer network defined by claim 9, wherein the processing device combines the subnet mask and the interface address in a bitwise AND manner to yield the plurality of subnet addresses.

16. An apparatus for causing network traffic to be rerouted in a computer network defined by claim 15, wherein the processing device disregards the highest and lowest subnet addresses of the plurality of subnet addresses, the processing device disregarding the address of the selected routing element from the plurality of subnet addresses, the processor identifying the remaining subnet address as the address of the neighboring routing element.

17. An apparatus for causing network traffic to be rerouted in a computer network defined by claim 9, wherein the processing device comprises at least one of an application specific integrated circuit (ASIC), microprocessor, microcontroller, field programmable gate array (FPGA), and computer.

18. An apparatus for causing network traffic to be rerouted in a computer network defined by claim 9, wherein the input device comprises at least one of a keyboard, mouse, touchpad, and trackball.

19. A method of determining the address of a routing element neighboring a selected routing element in a computer network, the method comprising:
combining a subnet mask and an interface address associated with the selected routing element in a bitwise AND manner to generate a plurality of subnet addresses;
disregarding the highest and lowest subnet addresses of the plurality of subnet addresses;
disregarding the address of the selected routing element from the plurality of subnet addresses;
identifying the remaining subnet address as the address of the neighboring routing element;
performing an exception rule set using demand criteria to determine whether to connect to the neighboring router of the remaining subnet address as part of a neighborhood associated with the selected routing element; and
outputting an interactive display of a network topology showing information concerning the neighborhood based on performing the exception rule set,
wherein an initial cost associated with the selected routing element or the neighbor router is stored in a file in response to selection of the selected routing element or the neighbor router, the file uniquely identifying an operator and including a unique session identification in which maintenance activity is to be performed by the operator,
wherein the initial cost is changed to a modified cost and a preview of the effect that the modified cost will have on rerouting of network traffic in the computer network is displayed prior to applying the modified cost, and
wherein the computer network is automatically restored to its original initial state in response to completion of maintenance activities in the computer network by the operator by identifying the file corresponding the operator and the session identification and the computer network is modified with the configuration information stored therein.

20. An apparatus for determining the address of a routing element neighboring a selected routing element in a computer network, the apparatus comprising:
a processing device;
an input device, the input device being operatively coupled to the processing device, the selected routing element being selected by the input device; and
a display, the display being operatively coupled to the processing device, the processing device combining a subnet mask and an interface address of a selected routing element in a bitwise AND manner to yield a plurality of subnet addresses, the processing device disregarding the highest and lowest subnet addresses of the plurality of subnet addresses, the processing device disregarding the address of the selected routing element from the plurality of subnet addresses, the processor identifying the remaining subnet address as the address of the neighboring routing element, performing an exception rule set using demand criteria to determine whether to connect to the neighboring router of the remaining subnet address as part of a neighborhood associated with the selected routing element, outputting on the display an interactive network topology showing information concerning the neighborhood based on performing the exception rule set,
wherein an initial cost associated with the selected routing element or the neighbor router is stored in a file in response to selection of the selected routing element of the neighbor router, the file uniquely identifying an operator and including a unique session identification in which maintenance activity is to be performed by the operator,
wherein the initial cost is changed to a modified cost, a preview of the effect that the modified cost will have on rerouting of network traffic in the network being displayed prior to applying the modified cost, and
wherein the computer network is automatically restored to its original initial state in response to completion of maintenance activities in the computer network by the operator by identifying the file corresponding the operator and the session identification and the computer network is modified with the configuration information stored therein.

* * * * *